United States Patent [19]

Collins et al.

[11] Patent Number: 4,937,312

[45] Date of Patent: Jun. 26, 1990

[54] PROCESS FOR PRODUCING ELASTOMERIC ACETAL POLYMERS

[75] Inventors: George L. Collins, Maplewood; Kurt F. Wissbrun, Short Hills; Hongkyu Kim, Madison, all of N.J.

[73] Assignee: Hoechst Celanese Corp., Somerville, N.J.

[21] Appl. No.: 448,746

[22] Filed: Dec. 11, 1989

[51] Int. Cl.$^5$ .............................................. C08G 2/24
[52] U.S. Cl. .................................. 528/230; 528/241; 528/243; 528/246; 528/249; 528/250; 528/270; 528/393; 525/414; 525/398; 525/403; 525/405; 524/701; 524/715; 524/717
[58] Field of Search ............... 528/230, 241, 243, 249, 528/246, 270, 250, 393; 525/414, 398, 403, 405; 524/701, 715, 717

[56] References Cited

U.S. PATENT DOCUMENTS

| | | | |
|---|---|---|---|
| 3,297,647 | 1/1967 | Schott et al. | 528/241 |
| 3,337,507 | 8/1967 | Gutweiler et al. | 528/249 |
| 3,385,827 | 5/1968 | Fischer et al. | 528/249 |
| 3,639,192 | 2/1972 | Burg et al. | 156/327 |
| 3,848,020 | 11/1974 | Burg et al. | 528/242 |
| 3,980,734 | 9/1976 | Burg et al. | 525/110 |
| 4,181,685 | 1/1980 | Kern et al. | 525/402 |
| 4,427,807 | 1/1984 | Zimmerman et al. | 523/466 |
| 4,666,995 | 5/1987 | Auerbach et al. | 525/400 |
| 4,758,608 | 7/1988 | Collins et al. | 522/43 |
| 4,788,258 | 11/1988 | Collins et al. | 525/414 |

Primary Examiner—John Kight, III
Assistant Examiner—S. A. Acquah
Attorney, Agent, or Firm—Marvin Turken

[57] ABSTRACT

There are provided new elastomeric copolymers of about 15 to 45 mol %, preferably about 25 to 35 mol % trioxane, about 55 to 85 mol %, preferably about 65 to 75 mol % of 1,3-dioxolane, said mol percents based on the total of trioxane and 1,3-dioxolane, and about 0.005 to 0.15 wt. %, preferably about 0.05 to 0.12 wt. % of 1,4-butanediol diglycidyl ether or butadiene diepoxide as a bifunctional monomer, based on the total weight of copolymer. The elastomeric copolymers may be prepared by mixing said monomers in a substantially dry state and under an inert atmosphere with a cationic polymerization catalyst, e.g., p-nitrobenzenediazonium tetrafluoroborate. The elastomeric copolymers have a strong interaction with moldable, crystalline acetal polymers comprising at least 85 mol % of polymerized oxymethylene units and may be used as a blending agent with such crystalline acetal polymers or as a bonding agent to improve the adhesiveness of the crystalline acetal polymer to other materials.

5 Claims, No Drawings

PROCESS FOR PRODUCING ELASTOMERIC ACETAL POLYMERS

This application is a division of application Ser. No. 243,381, filed Sept. 12, 1988.

BACKGROUND OF THE INVENTION

1. Field of the Invention

Molding compositions comprising acetal polymers having a high degree of crystallinity at room temperature have been in commercial use for many years. They have application in a wide variety of end uses, e.g., automobile applications such as bumper extensions and instrument panels, plumbing supplies such as valves, shower assemblies, flush tank components, faucets and pipe fittings, tool components such as screw driver adaptors, and household and personal products, such as quick boiling electric water kettles.

These crystalline acetal polymers have a highly favorable spectrum of physical properties which are responsible for their wide commercial acceptance. However, for certain applications, an improved capacity of the latter crystalline polymers for being blended into stable homogeneous molding compositions with other components such as certain stabilizers, would be highly desirable. Moreover, for certain end uses, e.g., those involving a laminated structure or the use of reinforcing materials in the interior of a molded article, a greater degree of adhesiveness between the surface of a crystalline acetal polymer and another surface, e.g., composed also of crystalline acetal polymer, or another material such as glass, metal or wood, is very beneficial.

This invention relates to novel, relatively elastomeric acetal copolymers which have little or no crystallinity at room temperature (about 25° C.). These copolymers have a strong interaction with moldable acetal polymers which contain a major proportion of oxymethylene units in the polymer chain and a high degree of crystallinity at room temperature. Because of this strong interaction, the elastomeric acetal copolymers can be blended with moldable crystalline acetal polymers to obtain a moldable resin composition having improved morphology. The elastomeric acetal copolymers can also be used as bonding resins between two surfaces of a crystalline acetal polymer and between crystalline acetal polymers and other materials such as glass, metal or wood.

2. Description of Related Art

The following prior art references are disclosed in accordance with the terms of 37 CFR 1.56, 1.97 and 1.98.

U.S. Pat. No. 3,639,192, issued Feb. 1, 1972 to Burg et al., discloses for use as adhesives copolymers of formaldehyde or trioxane with 1 to 60% by weight, preferably 1 to 30% by weight, of a cyclic ether, cyclic and/or linear acetal, e.g., 1,3-dioxolane, and/or an alkyl glycidyl formal, polyglycol diglycidyl ether or bis (alkane triol) triformal. Example 5 discloses a terpolymer of 97.95 wt. % of trioxane, 2 wt. % of ethylene oxide, and 0.05 wt. % of 1,4-butanediol diglycidyl ether.

U.S. Pat. No. 3,337,507, issued Aug. 22, 1967 to Gutweiler et al., teaches the formation of high molecular weight copolymers obtained by polymerizing a mixture of trioxane and any of certain polyformals. Example 4 of the patent shows the use of a polyformal which is a clear highly viscous oil at 70° C. obtained by polymerizing a mixture of $\frac{1}{2}$ mole of trioxane and 1 mole of dioxolane in the presence of p-nitrophenyl-diazonium fluoroborate as catalyst.

Japanese Kokai Sho 42-22065 of Yamaguchi et al., published Oct. 30, 1967, discloses copolymers of trioxane and an aperiodic ring compound, e.g., 1,3-dioxolane, prepared in liquid sulfur dioxide, and in Example 1 shows a copolymer of trioxane and 64 mol % of 1,3-dioxolane.

Pending application Ser. No. 096,187, filed Sept. 14, 1987 by Collins et al. and now U.S. Pat. No. 4,788,258, issued Nov. 29, 1988, discloses and claims certain copolymers of trioxane with from 65 to 75 mol percent of dioxolane, having an IV of about 1.0 to 2.3, which are useful as blending and adhesive agents for conventional crystalline acetal polymers.

Pending application Ser. No. 096,189 filed Sept. 14, 1987 by Collins et al., discloses and claims bonded articles of conventional crystalline acetal polymers wherein the bonding agents are certain copolymers of trioxane with from 65 to 75 mol percent of dioxolane, having an IV of about 1.0 to 2.3.

SUMMARY OF THE INVENTION

In accordance with this invention, there are provided new elastomeric copolymers of about 15 to 45 mol %, preferably about 25 to 35 mol % trioxane, about 55 to 85 mol %, preferably about 65 to 75 mol % of 1,3-dioxolane, said mole percents based on the total of trioxane and 1,3-dioxolane, and about 0.005 to 0.15 wt. %, preferably about 0.05 to 0.12 wt. %, of 1,4-butanediol diglycidyl ether or butadiene diepoxide as a bifunctional monomer, based on the total weight of copolymer. In addition to being elastomeric, the copolymers of this invention are substantially non-crystalline at room temperature (25° C.).

Because the inventive elastomeric copolymers have a strong interaction with normally crystalline acetal polymers widely used in the production of various molded articles, such copolymers are effective as blending agents for such crystalline acetal polymers, when blended with one of the latter polymers and any of various other components, e.g., stabilizers. The copolymers of the invention are also effective as a bonding resin between surfaces of crystalline acetal polymers and various other materials, e.g., another surface of a crystalline acetal polymer, glass, metal or wood.

DESCRIPTION OF PREFERRED EMBODIMENTS

The monomers used in the preparation of the elastomeric copolymers of this invention are preferably fairly dry, i.e., contain no more than about 10 ppm of water. The monomers are dried using techniques well known in the art, e.g., azeotropic distillation with benzene or by distilling the monomer in contact with sodium or potassium metal onto activated molecular sieves and keeping the monomer in contact with circulating nitrogen which itself is dried by contact with $P_2O_5$.

The elastomeric copolymers of this invention may be formed by a process of bulk polymerization wherein appropriate amounts of dry 1,3-dioxolane and 1,4-butanediol diglycidyl ether (BDGE) or butadiene diepoxide are added to dry molten trioxane to form a polymerizable mixture which in most cases remains liquid at room temperature. The polymerization reaction is carried out under an inert atmosphere, e.g., one obtained using dry nitrogen, argon, or the like, or a mixture of inert gases, in the presence of a catalytically effective amount of a cationic polymerization catalyst, such as p-nitrobenzenediazonium tetrafluoroborate (PNDB), trifluoromethane sulfonic acid, boron trifluoride, a boron trifluoride etherate such as boron trifluoride dibutyletherate, or the like, e.g., an amount ranging, for example, from about $1 \times 10^{-4}$ M/l to about $5 \times 10^{-3}$ M/l and preferably from about $1 \times 10^{-3}$ M/l to about $1.5 \times 10^{-3}$ M/l, based on the volume of the reaction medium, i.e., reactants plus any solvents, suspending agents or other additives employed.

If PNDB is used as the catalyst, it is often convenient to add it as a solution, e.g., of about 5 to 10 wt. %, in nitromethane.

The polymerization reaction is carried out, for example, at a temperature of from about 15° to about 30° C., and preferably at from about 20° to about 25° C., at pressures ranging from about 750 to about 770 psi, for about 15 to about 30 hours, preferably about 20 to about 25 hours.

These polymers can also be prepared under the foregoing conditions by polymerizing the monomers in a solvent, solvent mixture or suspending agent for the monomers, e.g., a halogenated hydrocarbon such as methylene chloride, a hydrocarbon such as hexane, cyclohexane, nonane or dodecane, or the like, or a mixture of two or more of these or other suitable solvents or suspending agents.

In addition to the prescribed monomers, the monomer mixture used to prepare the elastomeric copolymers of this invention may contain minor amounts of related monomers, e.g., up to about 5 mol % of other cyclic formals, e.g., ethylene oxide or 1,4-butanediol formal, and up to about 1 wt. % of other bifunctional monomers, e.g., diglycidyl ethers of ethylene glycol and higher alkanediols other than 1,4-butanediol.

The elastomeric copolymers of the invention will in most cases have an inherent viscosity of about 0.7 to 2.75, measured at 25° C. in a 0.2 weight percent solution in hexafluoroisopropanol (HFIP). In addition, the elastomeric copolymers are in most cases substantially noncrystalline in the unstretched state at room temperature (25° C.), as indicated by differential scanning calorimetry (DSC) data.

The elastomeric copolymers of the invention have enhanced elastomeric properties over a wide temperature range. For example, in most cases they can be formed into a ball that will hold its shape and will not collapse under its own weight after an extended period. Furthermore, the copolymers can usually be stretched in the fashion of a rubber band and substantially recover their previous length when released. When the elastomeric copolymers of the invention are subjected to a standard oscillatory flow test at an elevated temperature, e.g., 190° C., they are shown to largely retain their properties of elasticity and viscosity. Thus, they are particularly suitable for being processed with moldable crystalline acetal polymers at temperatures close to or above the melting points of the latter polymers for the purpose of improving their morphology and/or adhesiveness to other materials.

The moldable, crystalline acetal polymers whose performance is capable of being improved by means of the elastomeric copolymers of this invention include any oxymethylene polymer having oxymethylene groups which comprise at least about 85 percent of the polymer's recurring units, i.e., homopolymers, copolymers, terpolymers and the like.

Typically, crystalline oxymethylene homopolymers, also called polyformaldehydes or poly(oxymethylenes), are prepared by polymerizing anhydrous formaldehyde or trioxane, a cyclic trimer of formaldehyde. For example, high molecular weight polyoxymethylenes have been prepared by polymerizing trioxane in the presence of certain fluoride catalysts, such as antimony fluoride. Polyoxymethylenes may also be prepared in high yields and at rapid reaction rates by the use of catalysts comprising boron fluoride coordination complexes with organic compounds, as described in U.S. Pat. No. 2,898,506 to Hudgin et al.

Oxymethylene homopolymers are usually stabilized against thermal degradation by end-capping with, for example, ester or ether groups such as those derived from alkanoic anhydrides, e.g., acetic anhydride, or dialkyl ethers, e.g., dimethyl ether, or by incorporating stabilizer compounds into the homopolymer, as described in U.S. Pat. No. 3,133,896 to Dolce et al.

Crystalline oxymethylene copolymers which are especially suitable for utilization with the elastomeric copolymers of this invention will usually possess a relatively high level of polymer crystallinity, i.e., about 60 to 80 percent or higher. These preferred oxymethylene copolymers have repeating units which consist essentially of oxymethylene groups interspersed with ox(higher)alkylene groups represented by the general formula:

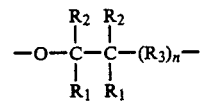

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

Oxymethylene groups generally will constitute from about 85 to about 99.9 percent of the recurring units in such crystalline copolymers. The oxy(higher)alkylene groups incorporated into the copolymer during copolymerization produce the copolymer by the opening of the ring of a cyclic ether or cyclic formal having at least two adjacent carbon atoms, i.e., by the breaking of an oxygen-to-carbon linkage.

Crystalline copolymers of the desired structure may be prepared by polymerizing trioxane together with from about 0.1 to about 15 mol percent of a cyclic ether or cyclic formal having at least two adjacent carbon atoms, preferably in the presence of a catalyst such as a Lewis acid (e.g., $BF_3$, $PF_5$, and the like) or other acids (e.g., $HClO_4$, 1% $H_2SO_4$, and the like), ion pair catalysts, etc.

In general, the cyclic ethers and cyclic formals employed in making these preferred crystalline oxymethylene copolymers are those represented by the general formula:

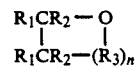

wherein each $R_I$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

The cyclic ether and cyclic formal preferred for use in preparing these preferred crystalline oxymethylene copolymers are ethylene oxide and 1,3-dioxolane, respectively. Among the other cyclic ethers and cyclic formals that may be employed are 1,3-dioxane, trimethylene oxide, 1,2-propylene oxide, 1,2-butylene oxide, 1,3-butylene oxide, 1,4-butanediol formal, and the like.

Crystalline oxymethylene copolymers produced from the preferred cyclic ethers have a structure composed substantially of oxymethylene and oxy(lower-)alkylene, preferably oxyethylene, groups, and are thermoplastic materials having a melting point of at least 150° C. They normally are millable or processable at temperatures ranging from 180° C. to about 200° C., and have a number average molecular weight of at least 10,000 and an inherent viscosity of at least 1.0 (measured at about 25° C. in a 0.2 weight percent solution in HFIP).

These crystalline oxymethylene copolymers preferably are stabilized to a substantial degree prior to being utilized with the elastomeric copolymers of this invention. This can be accomplished by degradation of unstable molecular ends of the polymer chains to a point where a relatively stable carbon-to-carbon linkage exists at each end of each chain. Such degradation may be effected by hydrolysis, as disclosed, for example, in U.S. Pat. No. 3,219,623 to Berardinelli.

The crystalline oxymethylene copolymer may also be stabilized by end-capping, again using techniques well known to those skilled in the art. End-capping is preferably accomplished by acetylation with acetic anhydride in the presence of sodium acetate catalyst.

A particularly preferred class of crystalline oxymethylene copolymers is commercially available from Hoechst-Celanese Corporation under the designation CELCON acetal copolymer, and especially preferred is CELCON M25 acetal copolymer, which has a melt index of about 2.5g/10 min. when tested in accordance with ASTM D1238-82.

Crystalline oxymethylene terpolymers having oxymethylene groups, oxy(higher)alkylene groups such as those corresponding to the above-recited general formula:

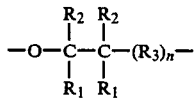

and a different, third group interpolymerizable with oxymethylene and oxy(higher)alkylene groups may be prepared, for example, by reacting trioxane, a cyclic ether or cyclic acetal and, as the third monomer, a bifunctional compound such as diglycide of the formula:

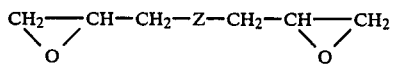

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy)group, preferably one having from 2 to 4 recurring lower alkoxy groups each with 1 or 2 carbon atoms, for example, ethylene diglycide, diglycidyl ether and diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol; 1,4-butanediol; 1,3-butanediol; cyclobutane-1,3-diol; 1,2-propanediol; cyclohexane-1,4-diol and 2,2,4,4-tetramethylcyclobutane-1,3-diol, with butanediol diglycidyl ethers being most preferred.

Generally, when preparing such crystalline terpolymers, ratios of from 99.89 to 89.0 weight percent trioxane, 0.1 to 10 weight percent of the cyclic ether or cyclic acetal and 0.01 to 1 weight percent of the bifunctional compound are preferred, these percentages being based on the total weight of monomers used in forming the terpolymer. Ratios of from 99.85 to 89.5 weight percent of trioxane, 0.1 to 10 weight percent of cyclic ether or cyclic acetal and 0.05 to 0.5 weight percent of diglycidyl ether are particularly preferred, these percentages again being based on the total weight of monomers used in forming the terpolymer.

Terpolymer polymerization in preparing the contemplated crystalline terpolymers may be carried out according to known methods of solid, solution or suspension polymerization. As solvents or suspending agents, one may use inert aliphatic or aromatic hydrocarbons, halogenated hydrocarbons or ethers.

Trioxane-based terpolymer polymerization is advantageously carried out at temperatures at which trioxane does not crystallize out, that is, at temperatures within the range of from about 65° C. to about 100° C.

Cationic polymerization catalysts, such as organic or inorganic acids, acid halides and, preferably, Lewis acids, can be used in preparing the crystalline terpolymers. Of the latter, boron fluoride and its complex compounds, for example, etherates of boron fluoride, are advantageously used. Diazonium fluoroborates are particularly advantageous.

Catalyst concentration may be varied within wide limits, depending on the nature of the catalyst and the intended molecular weight of the crystalline terpolymer. Thus, catalyst concentration may range from about 0.0001 to about 1 weight percent, and preferably will range from about 0.001 to about 0.1 weight percent, based on the total weight of the monomer mixture.

Since catalysts tend to decompose the crystalline terpolymer, the catalyst is advantageously neutralized immediately after polymerization using, for example, ammonia or methanolic or acetonic amine solutions.

Unstable terminal hemiacetal groups may be removed from the crystalline terpolymers in the same manner as they are from other oxymethylene polymers. Advantageously, the terpolymer is suspended in aqueous ammonia at temperatures within the range of from about 100° C. to about 200° C., if desired in the presence of a swelling agent such as methanol or n-propanol. Alternatively, the terpolymer is dissolved in an alkaline medium at temperatures above 100° C. and subsequently reprecipitated. Suitable alkaline media include benzyl alcohol, ethylene glycol monoethyl ether, or a mixture of 60 weight percent methanol and 40 weight percent water containing ammonia or an aliphatic amine.

The crystalline terpolymers may also be thermally stabilized by degrading unstable molecular ends of their chains to a point where a relatively stable carbon-to-carbon linkage exists at each end of each chain. Thermal stabilization will preferably be carried out in the absence of a solvent in the melt, in the presence of a thermal stabilizer.

Alternatively, the crystalline terpolymer can be subjected to heterogeneous hydrolysis wherein water, with or without a catalyst, e.g., an aliphatic or aromatic amine, is added to a melt of the terpolymer in an amount ranging from about 1 to about 50 percent by weight, based on the weight of the terpolymer. The resulting mixture is maintained at a temperature in the range of from about 170° C. to 250° for a specified period of time, and then washed with water and dried or centrifuged.

A preferred crystalline oxymethylene terpolymer is commercially available from Hoechst-Celanese Corporation under the designation CELCON U10 acetal polymer, and is a butanediol diglycidyl ether/ethylene oxide/trioxane terpolymer containing about 0.05 weight percent, 2.0 weight percent, and 97.95 weight percent of repeating units derived from these termonomers, respectively, based on the total weight of these termonomers.

Crystalline oxymethylene polymers admixed with plasticizers, formaldehyde scavengers, mold lubricants, antioxidants, fillers, colorants, reinforcing agents, light stabilizers and other stabilizers, pigments, and the like, can be used with the elastomeric copolymers of this invention so long as such additives do not materially affect the desired interaction between the crystalline polymer and the elastomeric copolymer, particularly enhancement of impact strength of blends of the two polymers. Such additives can be admixed with the elastomeric copolymer of this invention, the crystalline oxymethylene polymer, or the blend of two using conventional mixing techniques.

Suitable formaldehyde scavengers include cyanoguanidine, melamine and melamine derivatives, such as lower alkyl- and amine-substituted triazines, amidines, polyamides, ureas, metal oxides and hydroxides, such as calcium hydroxide, magnesium hydroxide, and the like, salts of carboxylic acids, and the like. Cyanoguanidine is the preferred formaldehyde scavenger. Suitable mold lubricants include alkylene bisstearamides, long-chain amides, waxes, oils, and polyether glycides. A preferred mold lubricant is commercially available from Glycol Chemical, Inc. under the designation Acrawax C, and is an alkylene bisstearamide. The preferred antioxidants are hindered bisphenols. Especially preferred is 1,6-hexamethylene bis-(3,5-di-t-butyl-hydroxyhydrocinnamate), commercially available from Ciba-Geigy Corp. under the designation Irganox 259.

A most preferred crystalline oxymethylene two component copolymer for use with the elastomeric copolymers of this invention is commercially available from Hoechst Celanese Corporation under the designation CELCON M25-04 acetal polymer. This is the previously mentioned CELCON M25 acetal copolymer stabilized by 0.5 percent by weight Irganox 259, 0.1 percent by weight cyanoguanidine, and 0.2 percent by weight Acrawax C.

A most preferred crystalline oxymethylene terpolymer for use with the elastomeric copolymers of this invention is commercially available from Hoechst Celanese Corporation under the designation CELCON U10-11 acetal polymer. This is the previously mentioned CELCON U-10 acetal terpolymer stabilized by 0 5 percent by weight Irganox 259 and 0.1 percent by weight calcium ricinoleate.

The following examples further illustrate the invention.

EXAMPLE 1

Dry, freshly distilled, molten trioxane in an amount of 300 ml was transferred under a nitrogen atmosphere to a half gallon reactor fitted with a magnetic stirrer which was previously purged with nitrogen. There were then added to the reactor under a nitrogen atmosphere 700 ml of dry 1,3-dioxolane and 1 ml of dry 1,4-butanediol diglycidyl ether (BDGE). The mixture was allowed to fall to room temperature (25° C.). The catalyst for the reaction was p-nitrobenzenediazonium tetrafluoroborate (PNDB) which was initially added as 3 ml of a dry solution of 356 mg in 10 ml of nitromethane ($0.45 \times 10^{-3}$ M/l of catalyst). Before reaction started, 1 ml of the reaction mass was tested in a moisture meter and found to contain no water. Subsequently, an additional amount of PNDB as 2 ml of a solution of 1186 mg of the catalyst in 10 ml of nitromethane ($1 \times \times 10^{-3}$ M/l of catalyst) was added to the reactor.

After about 24 hours of polymerization, the stirrer was stopped and 700 ml of methylene chloride plus enough tributylamine to neutralize the catalyst were added and the reaction shaken for about 24 hours, after which some of the polymer remained undissolved. The solution was then removed from the reactor.

An additional 500 ml of methylene chloride were added to the undissolved polymer and the material shaken for 24 hours, after which some of the polymer still remained undissolved. The solution was removed and added to 1000 ml of cold ethanol and stirred with a mechanical shaft stirrer for 1–2 hours. The resulting two-phase mixture was placed in an ice bath and allowed to stand for two hours after which time solid polymer settled. The ethanol was decanted and the polymer dried in a vacuum oven. The polymer was found by NMR analysis to contain about 32.0 mol % of polymerized trioxane and about 68.0 mol % of polymerized 1,3-dioxolane. It had an inherent viscosity (IV) of 2.46.

The work-up procedure described in the previous paragraph was repeated with the undissolved polymer remaining in the polymerization reactor. This polymer had an IV of 2.48.

EXAMPLE 2

The polymerization and work-up procedures of Example 1 were substantially followed except that only 2 ml of a solution of 1186 mg of PNDB in 10 ml of nitromethane ($1 \times 10^{-3}$ M/l of catalyst) was added to initiate the reaction. Before initation, 1 ml of the solution was tested in a moisture meter and found to contain no water.

Three cuts of polymer were taken by agitating with methylene chloride. The first cut obtained by agitating with 700 ml of methylene chloride for about 2 days had an IV of 2.70. The second cut obtained by agitating the undissolved polymer with 500 ml of methylene chloride for about 2 days was found by NMR analysis to contain 28.0 mol % of polymerized trioxane and 72.0 mol % of polymerized 1,3-dioxolane and had an IV of 2.26. The third cut obtained by agitating the still undissolved polymer with an additional 500 ml of methylene chloride had an IV of 2.07.

EXAMPLE 3

The polymerization and work-up procedures of Example 2 were substantially followed. Before initiation of the reaction, ml of the solution was found to contain no water. The first cut of polymer had an IV of 2.16. The second cut contained 26.0 mol % of polymerized trioxane and 74.0 mol % of polymerized 1,3-dioxolane and had an IV of 1.89. The third cut had an IV of 0.84.

EXAMPLE 4

The polymerization and work-up procedures of Example 2 were substantially followed. The first cut of polymer had an IV of 1.68. The second cut contained 30.0 mol % of polymerized trioxane and 70.0 mol % of polymerized 1,3-dioxolane and had an IV of 1.39. The third cut had an IV of 0.82.

Polymers similar in properties to those of the foregoing examples can be obtained by substituting butadiene diepoxide for the 1,4-butanediol diglycidyl ether in approximately the same amount by weight.

The polymers of the foregoing examples are useful as blending agents for the moldable crystalline acetal polymers as described previously and as bonding agents for the purpose of increasing the adhesiveness of such crystalline acetal polymers to other materials such as other surfaces of the same crystalline polymer, and glass.

We claim:

1. A process of preparing an elastomeric copolymer of about 15 to 45 mol % of trioxane and about 55 to 85 mol % of 1,3-dioxolane based on the total of trioxane and 1,3-dioxolane, and about 0.005 to 0.15 wt. % of 1,5-butanediol digylcidyl ether or butadiene diepoxide as a bifunctional monomer, based on the total weight of copolymer, comprising mixing said monomers in substantially dry state and under an inert atmosphere with a cationic polymerization catalyst.

2. The process of claim 1 wherein said catalyst is p-nitrobenzenediazonium tetrafluoroborate (PNDB).

3. The process of claim 2 wherein said PNDB is added as a solution in nitromethane.

4. The process of claim 1 wherein said catalyst is present in an amount of about $1 \times 10^{-4}$ M/l to $5 \times 10^{-3}$ M/l based on the total volume of reaction medium.

5. The process of claim 1 wherein said catalyst is present in an amount of about $1 \times 10^{-3}$ M/l to $1.5 \times 10^{-3}$ M/l, based on the total volume of reaction medium.

* * * * *